May 10, 1966 — E. J. RUSSELL — 3,250,140
POWER DEVICE
Filed July 1, 1964 — 2 Sheets-Sheet 1

INVENTOR.
EDWARD J. RUSSELL
BY

May 10, 1966 E. J. RUSSELL 3,250,140
POWER DEVICE
Filed July 1, 1964 2 Sheets-Sheet 2

INVENTOR.
Edward J. Russell
BY

United States Patent Office 3,250,140
Patented May 10, 1966

3,250,140
POWER DEVICE
Edward J. Russell, Rte. 8, Salisbury, N.C.
Filed July 1, 1964, Ser. No. 379,533
4 Claims. (Cl. 74—126)

The present invention generally relates to a power device and more particularly to a device by which the forces of gravity, leverage and manual power are combined to drive a generator.

An object of the present invention is to provide a power device employing a pendulum drivingly connected to a generator by a ratchet mechanism for imparting undirectional rotation to the generator.

A further object of this invention is to provide a power device having a spring assembly incorporated into the drive mechanism and a lever mechanism which is manually operated for imparting movement to the pendulum.

Another important object of the present invention is to provide a power device in which a pendulum that is rounded to reduce air friction is used.

Yet another object of this invention is to provide a power device for driving a generator which is simple in construction, efficient in operation, long lasting and relatively inexpensive to construct and maintain.

Figure 1:
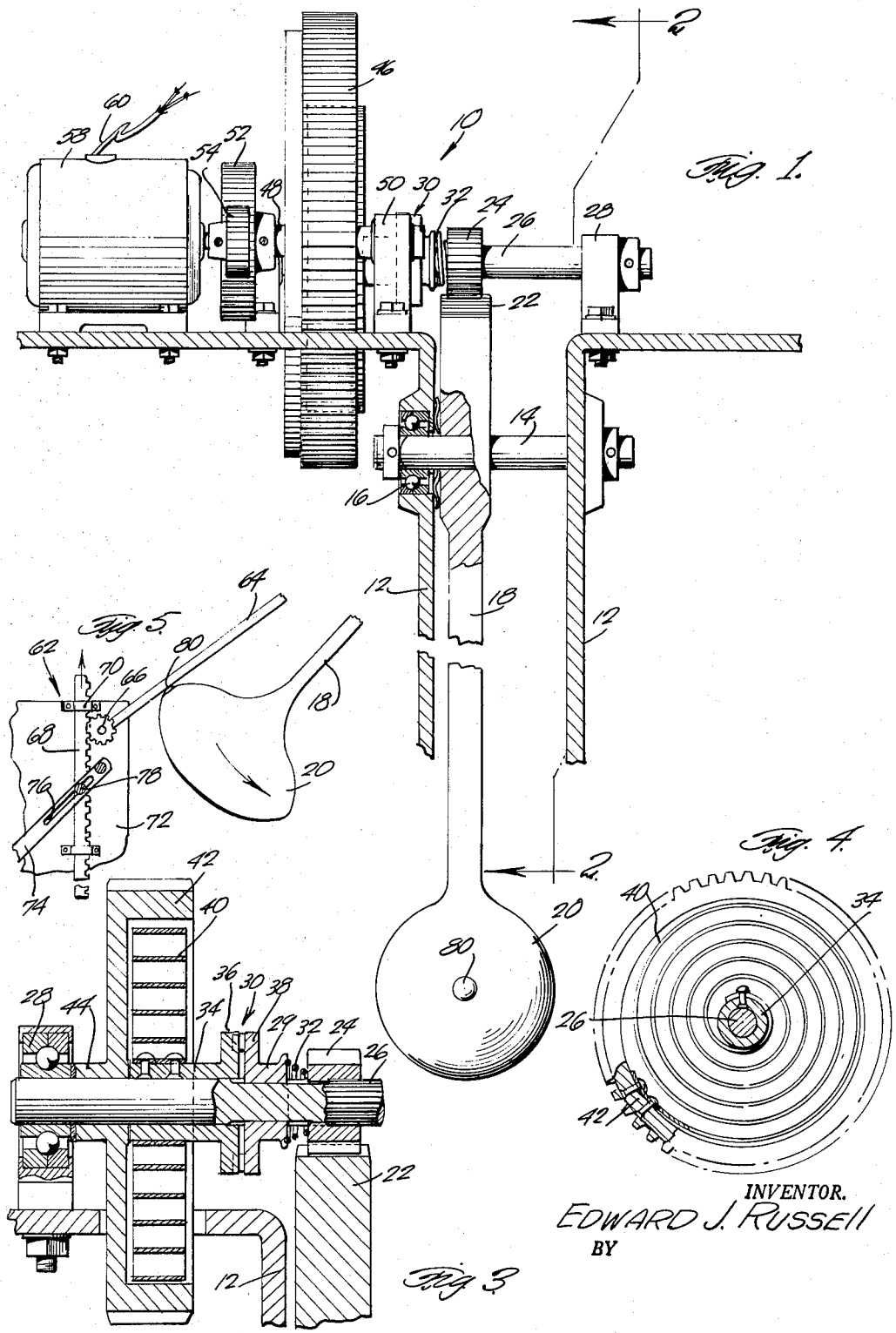
Figure 2:
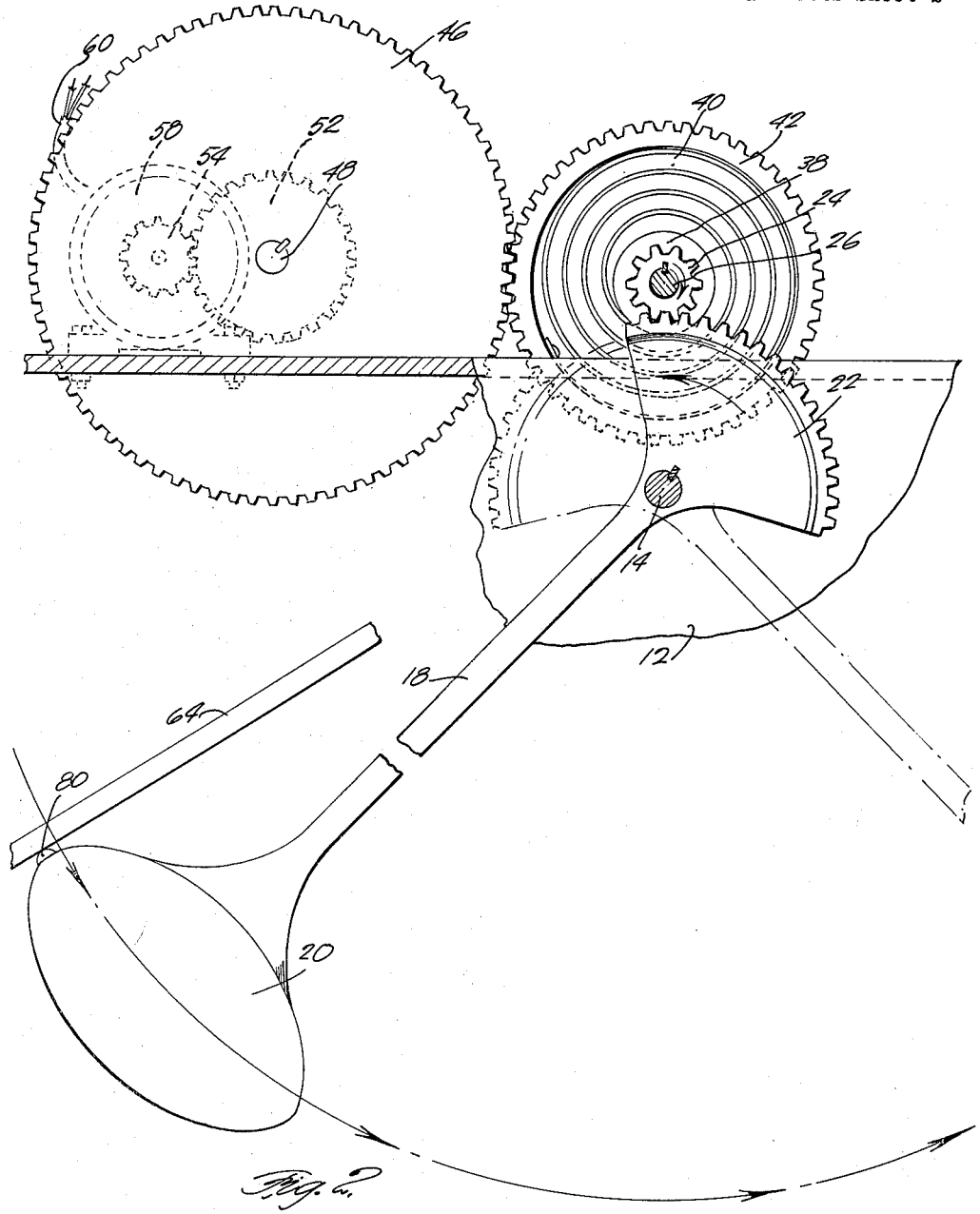

The foregoing and other objects, features and advantages of the invention will be apparent from the following more particular description of a preferred embodiment of the invention as illustrated in the accompanying drawing, wherein:

FIGURE 1 is an elevational view of the power device of the present invention with portions thereof broken away to illustrate the details thereof, FIGURE 2 is a sectional view taken along section line 2—2 of FIGURE 1, FIGURE 3 is a sectional view of the drive mechanism between the pendulum and generator, FIGURE 4 is a sectional view of the spring member, and FIGURE 5 is a detailed view of the lever mechanism for imparting force to the pendulum.

Referring specifically to the drawings, the power device of the present invention is generally designated by numeral 10 and includes a supporting framework 12 supporting a shaft 14 in bearings 16. A pendulum 18 is supported by shaft 14 and has a large weight 20 on the lower end thereof which has rounded ends for aerodynamic cleanness for reducing drag caused by wind and air friction. The upper end of the pendulum 18 is provided with an arcuate gear 22 in meshing engagement with pinion gear 24 on shaft 26 journalled in bearing blocks 28 on the framework 12.

The pinion gear 24 is splined to the shaft 26 and one side 29 of a ratchet gear assembly 30 is also splined to the shaft 26 and a spring 32 is interposed between the gear 24 and the ratchet assembly 30. The ratchet gear assembly 30 also includes a hollow shaft 34 with a ratchet plate 36 thereon which engages a ratchet plate 38 on the previously mentioned side 29 for transmitting motion from shaft 26 to hollow shaft 34 in one direction only.

Attached to the hollow shaft 34 is a spiral spring 40 having the outer convolution thereof secured to the inner surface of an external gear 42 that is journalled on shaft 26 by the use of a hub 44 retained in place by one of the bearing blocks 28 and by the hollow shaft 34.

The gear 42 is in meshing engagement with a large gear 46 mounted on shaft 48 journalled in bearing blocks 50 on the framework 12. A smaller gear 52 is attached to shaft 48 in longitudinally spaced relation to gear 46 and is in meshing engagement with a smaller gear 54 attached to the input shaft 56 of a generator 58 for rotating the same and producing electric energy which passes to a point of use or storage through the conductor 60.

A lever mechanism 62 is located to one side of pendulum 18 and includes an elongated lever 64 having a pinion gear 66 on a pivotally mounted end thereof in meshing engagement with an elongated gear rack 68 carried by guides 70 attached to plate 72. A handle 74 is attached to the plate 72 and includes a slot 76 slidably receiving a projection 78 on the rack 68 for varying the vertical position thereof thereby swinging the lever 64 in a vertical plane for engagement with a projecting nose or rounded end 80 on the weight 20 for moving the weight 20 down towards the bottom of its path of movement.

In operation, the power device operates a generator for producing electric energy by combining the forces of gravity, leverage and manpower by using the lever 64 to force the pendulum 18 downwardly in each cycle of its operation which would be relatively slow compared to rotation of the generator.

Although the present invention has been disclosed in connection with a preferred embodiment thereof, variations and modifications may be resorted to by those skilled in the art without departing from the principles of the invention. Such variations and modifications are considered to be within the true spirit and scope of the invention, as disclosed in the foregoing description and defined by the appended claims.

What is claimed is:

1. A power device comprising a pendulum having an enlarged weight on the bottom end thereof, an arcuate segment gear on the top thereof, a pinion gear meshing with the segment gear, a shaft supporting said pinion gear, a one-way ratchet mechanism connected to said shaft, said mechanism including a hollow output shaft journalled on said first mentioned shaft, a spiral spring having an inner convolution attached to said hollow shaft, a large external ring gear enclosing said spring with the outer convolution of the spring attached to the ring gear, and gear means driven from said ring gear and connected to a generator for driving the same, and means for engaging said pendulum weight at the end of each cycle of movement for imparting a force thereto.

2. A power device comprising a pendulum having an enlarged weight on the bottom end thereof, an arcuate segment gear on the top thereof, a pinion gear meshing with the segment gear, a shaft supporting said pinion gear, a one-way ratchet mechanism connected to said shaft, said mechanism including a hollow output shaft journalled on said first mentioned shaft, a spiral spring having an inner convolution attached to said hollow shaft, a large external ring gear enclosing said spring with the outer convolution of the spring attached to the ring gear, and gear means driven from said ring gear and connected to a generator for driving the same, and means for engaging said pendulum weight at the end of each cycle of movement for imparting a force thereto, said means engaging the pendulum weight including a lever having a pinion gear attached thereto coincident with the pivotal axis thereof, a rack gear engaged with said pinion, and a handle connected to said rack gear for moving it lengthwise for oscillating the lever in a vertical plane in the path of movement of the pendulum weight for engaging the weight at the end of its cycle of movement for pushing the weight downwardly into its next cycle of movement.

3. A power device comprising a pendulum having an enlarged weight on the bottom end thereof, an arcuate segment gear on the top thereof, a pinion gear meshing with the segment gear, a shaft supporting said pinion gear, a one-way ratchet mechanism connected to said shaft, said mechanism including a hollow output shaft journalled on said first mentioned shaft, a spiral spring having an inner convolution attached to said hollow shaft, a large external ring gear enclosing said spring with the outer convolution of the spring attached to the ring gear, and gear means driven from said ring gear and connected to a generator for driving the same, and means for engaging said pendulum weight at the end of each cycle of movement for imparting a force thereto, said means engaging the pendulum weight including a lever having a pinion gear attached thereto coincident with the pivotal axis thereof, a rack gear engaged with said opinion, and a handle connected to said rack gear for moving it lengthwise for oscillating the lever in a vertical plane in the path of movement of the pendulum weight for engaging the weight at the end of its cycle of movement for pushing the weight downwardly into its next cycle of movement, said gear means including a speed increasing gearing assembly, said pendulum weight having rounded ends to reduce air friction.

4. A power device comprising a pendulum having an enlarged weight on the bottom end thereof, an arcuate segment gear on the top thereof, a pinion gear meshing with the segment gear, a shaft supporting said pinion gear, a one-way ratchet mechanism connected to said shaft, said mechanism including a hollow output shaft journalled on said first mentioned shaft, a spiral spring having an inner convolution attached to said hollow shaft, a large external ring gear enclosing said spring with the outer convolution of the spring attached to the ring gear, and gear means driven from said ring gear and connected to a generator for driving the same, and means for engaging said pendulum weight at the end of each cycle of movement for imparting a force thereto, said means engaging the pendulum weight including a lever having a pinion gear attached thereto coincident with the pivotal axis thereof, a rack gear engaged with said pinion, and a handle connected to said rack gear for moving it lengthwise for oscillating the lever in a vertical plane in the path of movement of the pendulum weight for engaging the weight at the end of its cycle of movement for pushing the weight downwardly into its next cycle of movement, said gear means including a speed increasing gearing assembly, said pendulum weight having rounded ends to reduce air friction, said one-way ratchet mechanism including a pair of facing plates, one of said plates being rigid with the hollow shaft, the other plate being movably splined to the first mentioned shaft, ratchet teeth on said plates, and spring means engaging the movable plate for maintaining the movable plate spring biased toward the plate on the hollow shaft.

References Cited by the Examiner
UNITED STATES PATENTS

| | | | |
|---|---|---|---|
| 879,254 | 2/1908 | Gautier | 74—133 X |
| 1,196,966 | 9/1916 | Molyneux | 74—133 X |
| 1,237,597 | 8/1917 | Zwarich | 74—126 |
| 1,332,870 | 3/1920 | Gill | 185—29 X |

BROUGHTON G. DURHAM, *Primary Examiner.*

J. A. MARSHALL, *Assistant Examiner.*